United States Patent [19]

Vacher et al.

[11] Patent Number: 5,619,279

[45] Date of Patent: Apr. 8, 1997

[54] VIDEO CIRCUIT USING SCAN VELOCITY MODULATION

[75] Inventors: Pierre Vacher, Suresnes; Phillippe Vilard, Houilles, both of France

[73] Assignee: U.S. Philips Corporation, New York, N.Y.

[21] Appl. No.: 546,860

[22] Filed: Oct. 23, 1995

[30] Foreign Application Priority Data

Oct. 26, 1994 [FR] France .................................. 94 12824

[51] Int. Cl.⁶ .............................. H04N 5/208; H04N 5/68
[52] U.S. Cl. .......................... 348/626; 348/707; 348/725
[58] Field of Search ..................................... 348/626, 725, 348/707; 358/242, 166; 315/371; H04N 5/208, 3/32, 5/68

[56] References Cited

U.S. PATENT DOCUMENTS 4,309,725  1/1982  Groeneweg .............................. 358/242
5,072,300  12/1991  Anderson ................................ 348/626

Primary Examiner—Sherrie Hsia
Attorney, Agent, or Firm—Edward W. Goodman

[57] ABSTRACT

This circuit includes an arrangement which modulates the horizontal velocity of the spot as a function of the video contents with the aid of a supplementary horizontal deflection coil. This arrangement essentially includes a video signal differentiator followed by an amplifier which supplies a current to the supplementary deflection coil. The current generated by the amplifier has a threshold (S) for the input signal, and a quasi-plateau for input signals beyond 25%. The difference between this current and the current which would be generated by a linear amplifier (broken-line curve) is concerned in this case. This difference, for example for an input voltage of 50%, is referred to as reserve (R). A trap filter is inserted upstream of the amplifier in the arrangement, which filter is centered on the chrominance subcarrier frequency and has a depth which is equal to about the value of the reserve.

6 Claims, 2 Drawing Sheets

VIDEO CIRCUIT USING SCAN VELOCITY MODULATION

BACKGROUND OF THE INVENTION

1. Field of the Invention

The invention relates to a device for displaying color pictures based on an analog video signal of the television type, comprising inter alia a luminance signal and a chrominance subcarrier, said device being provided with a bandstop filter centered on the frequency of the chrominance subcarrier and transmitting the luminance signal, a video signal processing circuit to which the luminance signal from the filter is applied, and a scan velocity modulation arrangement to which the luminance signal from the filter is also applied, said arrangement comprising a circuit for differentiating the luminance signal, followed by an amplifier which feeds a current into a coil, acting on the horizontal deflection of the spot.

Such an arrangement for modulating the scan velocity is intended to give the luminance transitions in a picture a sharper appearance.

With such an arrangement, there may be a risk of applying an improper velocity modulation when parasitic luminance signals, such as noise or a residue of the chrominance, subcarrier are present. Such a residue is always present because it is not possible to sufficiently filter the chrominance subcarrier in the above-mentioned filter because the passband of the luminance signal would then be eroded.

2. Description of the Related Art

An scan velocity modulation arrangement as described in the opening paragraph is known from U.S. Pat. No. 4,309,725. To avoid the above-mentioned drawback, this document describes a circuit in which the amplifier feeding the coil with the luminance signal differentiated by the differentiating circuit is an amplifier having a double threshold (i.e., for positive as well as negative voltage excursions) below which the differentiated signal is not active.

The presence of a threshold is useful, but if this threshold is too high, there will be a risk that useful video signals having a low amplitude are eliminated, whereas the parasitic signals will not be eliminated sufficiently if this threshold is low. A satisfactory compromise is difficult to find.

SUMMARY OF THE INVENTION

It is an object of the invention to provide a scan velocity modulation arrangement, in which this problem is solved.

To this end, said scan velocity modulation arrangement also comprises a second bandstop filter which is centered on the frequency of the chrominance subcarrier and whose maximum attenuation is limited.

The introduction of a filter, even if it is not placed in the path of the signal to be used by the video processing circuit, seems to be absurd because it involves a limitation of the passband towards the high range, i.e., it limits the action of the scan velocity modulation arrangement, whereas such an arrangement is especially intended for acting on higher frequencies. The invention is based on the recognition that, nevertheless, the introduction of a filter in the scan velocity modulation arrangement is eventually beneficial, provided that its attenuation is limited.

As the amplifier generates the current in accordance with a non-linear law relative to the luminance signal applied to its input, the maximum attenuation provided by the second filter is preferably equal, within plus or minus three Decibels, to the maximum difference between this current and the current which would be generated by a linear amplifier supplying the same maximum current.

In general, the maximum attenuation provided by the second filter is advantageously between −3 dB and −9 dB.

In a preferred embodiment, the second filter comprises a series resonant inductance and capacitance circuit, damped by a series resistor.

When the luminance signal is produced from three color components at the input of said arrangement by means of an adder consisting of a star-configured resistance network, the series resonant circuit is advantageously connected between the central point of said star network and ground, i.e., at the very head of the arrangement.

The above-mentioned star-configured resistance network comprising three resistors that feeds a current in an impedance having an ohmic value Z, and the angular frequency of the chrominance subcarrier being named ω, the series resonant circuit is realized by means of an inductance whose value L is advantageously such that ω is between four and ten times Z.

These and other aspects of the invention will be apparent from and elucidated with reference to the embodiments described hereinafter.

DESCRIPTION OF THE PREFERRED EMBODIMENT

The invention will be described with reference to a television display device, but it is also applicable to any other picture display device, for example, a monitor. Certain PAL television display devices have a comb filter for eliminating the subcarrier, which renders the filter of the present invention useless, but it remains applicable when the television display device does not have this comb filter. The invention is then useful for a SECAM television set or a monitor, or for PAL and NTSC television sets or monitors without a comb filter.

The principles of scan velocity modulation and their influence on the aspect of luminance transitions are well known. One may recall, that it is an artificial manner to give the viewer the impression that a picture is better defined than it is in reality. To obtain this effect, the luminance signal is passed through a differentiator stage which thus generates a signal when there is a transition of the luminance value, which signal is applied to the horizontal beam deflection system for creating a spot velocity difference. As it would be difficult to introduce a variation of the velocity in the known horizontal deflection circuits, it is preferred to use a supplementary deflection coil which is arranged close to the principal coils and in which a current proportional to the derivative with respect to time of the luminance signal is passed for correcting the spot velocity.

Figure 1:
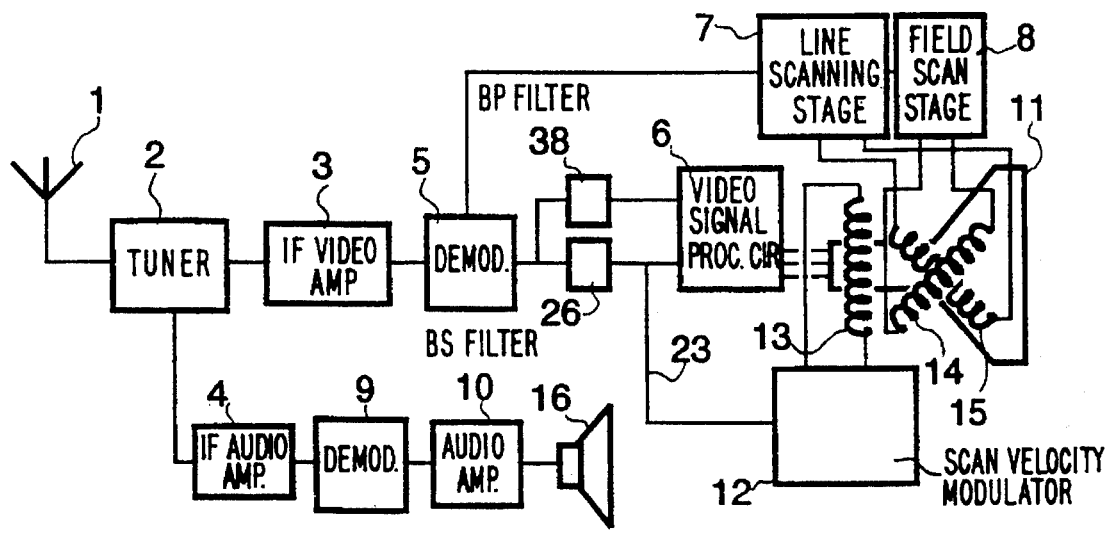
FIG. 1 shows, diagramatically, a television display device including a video circuit for scan velocity modulation.

The television display device which is shown, diagrammatically, in FIG. 1 comprises a tuner 2 selecting a signal from an antenna 1 (or from any other source) and transposing its frequency to those required by an intermediate frequency video amplifier 3 and an intermediate frequency sound or audio amplifier 4 following this tuner. The IF video amplifier 3 is followed by a demodulator 5 which supplies a video signal in baseband, and line and field synchronizing signals. The video and synchronizing signals may alternatively originate from an external source such as a satellite decoder or a video recorder. The synchronizing signals are applied to a line scanning stage 7 and a field scanning stage 8. The video signal from the decoder 5 goes through a bandpass filter 38 centered on the chrominance subcarrier frequency, for supplying a color difference signal to a video signal processing circuit 6, and a bandstop filter 26 centered on the chrominance subcarrier frequency for supplying a luminance signal to the same video signal processing circuit 6. The circuit 6 realizes the matrixing and amplification required for generating three red-green-blue color signals which are applied to the picture display tube 11. The field and line scanning stages 8 and 7 supply currents in main field and line deflection coils 14 and 15, respectively. The IF sound amplifier 4 is followed by a demodulator 9 which applies the audio signals in the baseband to an audio amplifier 10 feeding a loudspeaker 16. The luminance signals from the filter 26 are also transmitted to a scan velocity modulation arrangement 12 which supplies a current for modulating the horizontal velocity of the spot, as a function of the contents of said luminance signals, in a supplementary horizontal deflection coil 13. As the arrangement 12 inevitably introduces signal delays, there is a risk that its operation is not correctly synchronized with the video signal applied to the tube 11. To overcome this drawback, known delay circuits (not shown) of approximately 70 nS are introduced in the path of each color component in the video signal processing circuit.

Figure 2:
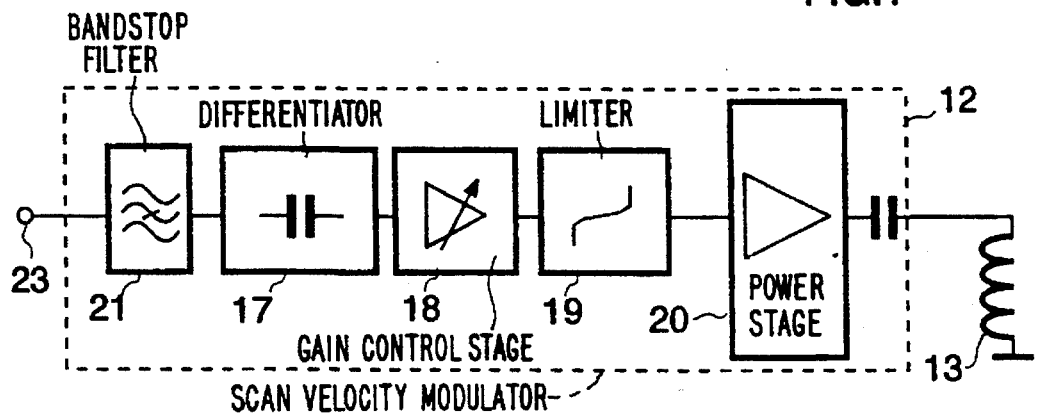
FIG. 2 shows, diagramatically, a scan velocity modulation arrangement.

The scan velocity modulation arrangement shown in FIG. 2 has an input 23 for the video signal from the filter 26 of FIG. 1. Connected in cascade from this input are:

a bandstop filter 21, also referred to as trap, centered on the chrominance subcarrier frequency, for example, in SECAM: 4.33 MHz (average of the frequencies for red and blue, viz 4.406 and 4.250 MHz, respectively), a video signal differentiator stage 17, a gain control stage 18, a limiter preamplifier stage 19 in which a limitation is realized by means of diodes, and a power stage 20 of the current generator type whose current output is connected to a terminal of the supplementary coil 13 via a capacitance.

Figure 3:
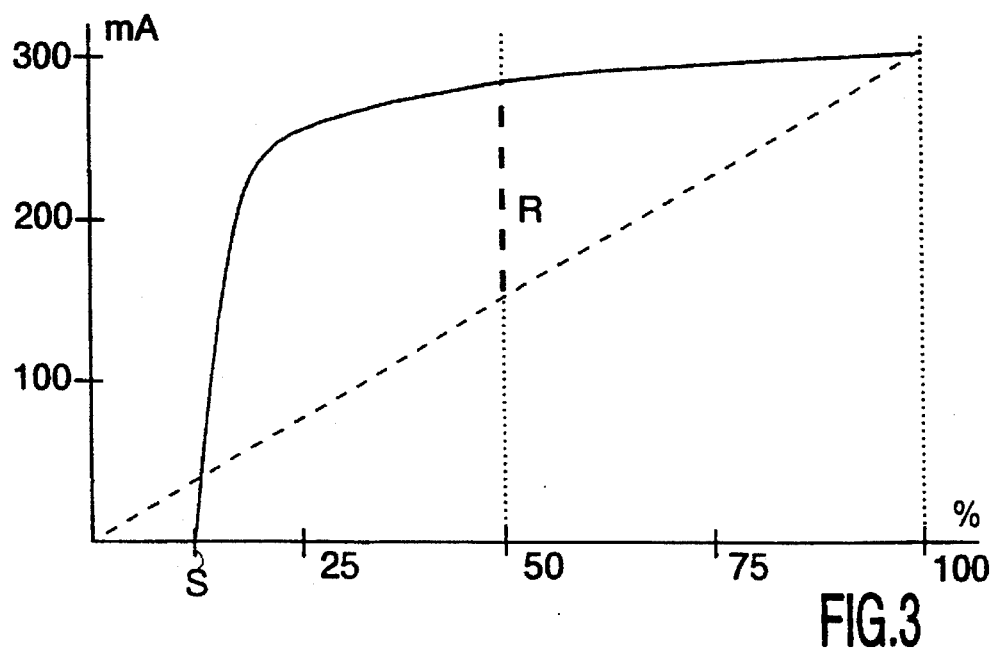
FIG. 3 is a curve illustrating the operation of the scan velocity modulation arrangement of FIG. 3.

FIG. 3 shows, on the abscissa: the level of the differentiated luminance signal at the output of the differentiator stage 17 expressed as a percentage of its maximum possible value, and on the ordinate: the value of the corresponding current produced by the amplifier 20 in the coil 13 with a maximum near 300 mA.

The broken-line curve shows the current which would be produced by a linear amplifier. The solid-line curve shows the current which is produced by the amplifier described hereinafter. The current only appears for a signal level of the order of 10% (point S). Moreover, since the limitation is realized by means of diodes, since there is evidently a saturation effect, due to the fact that the supply voltages are not infinite, and also because of the action of a control circuit (the gain of the assembly is reduced when the current increases in the power stage), the curve resembles an exponential.

It is obvious that a given differentiated signal from the stage 17 does or does not exceed the limitation threshold in the stage 19, dependent on whether it is more or less amplified in the stage 18. The general form of the curve may therefore be modified by the effect of the gain control stage 18.

There is a difference, indicated by "R", between the current generated by the actual arrangement (solid line) and the current which would be generated by a linear amplifier, yielding the same current for a 100% signal (broken-line diagonal). This difference constitutes a kind of "reserve" of current: for example, for a 50% signal, the current already reaches almost 300 mA, whereas it would only be 150 mA with the linear amplifier. This provides the possibility of improving the luminance transitions in a picture, even for signals having a higher frequency and whose amplitude could have been reduced by the filter 21. It will be evident that a signal which has a nominal amplitude and is even reduced by the filter will always yield a current approaching maximum. The "reserve" is approximately of a factor two.

A satisfactory operation is obtained when the depth of the trap (or in other words, the maximum attenuation of the bandstop filter 21) is of the order of the reserve value, i.e., two (−6 dB), and in practice, the attenuation provided by the filter may advantageously be between −3 dB and −9 dB.

Figure 4:
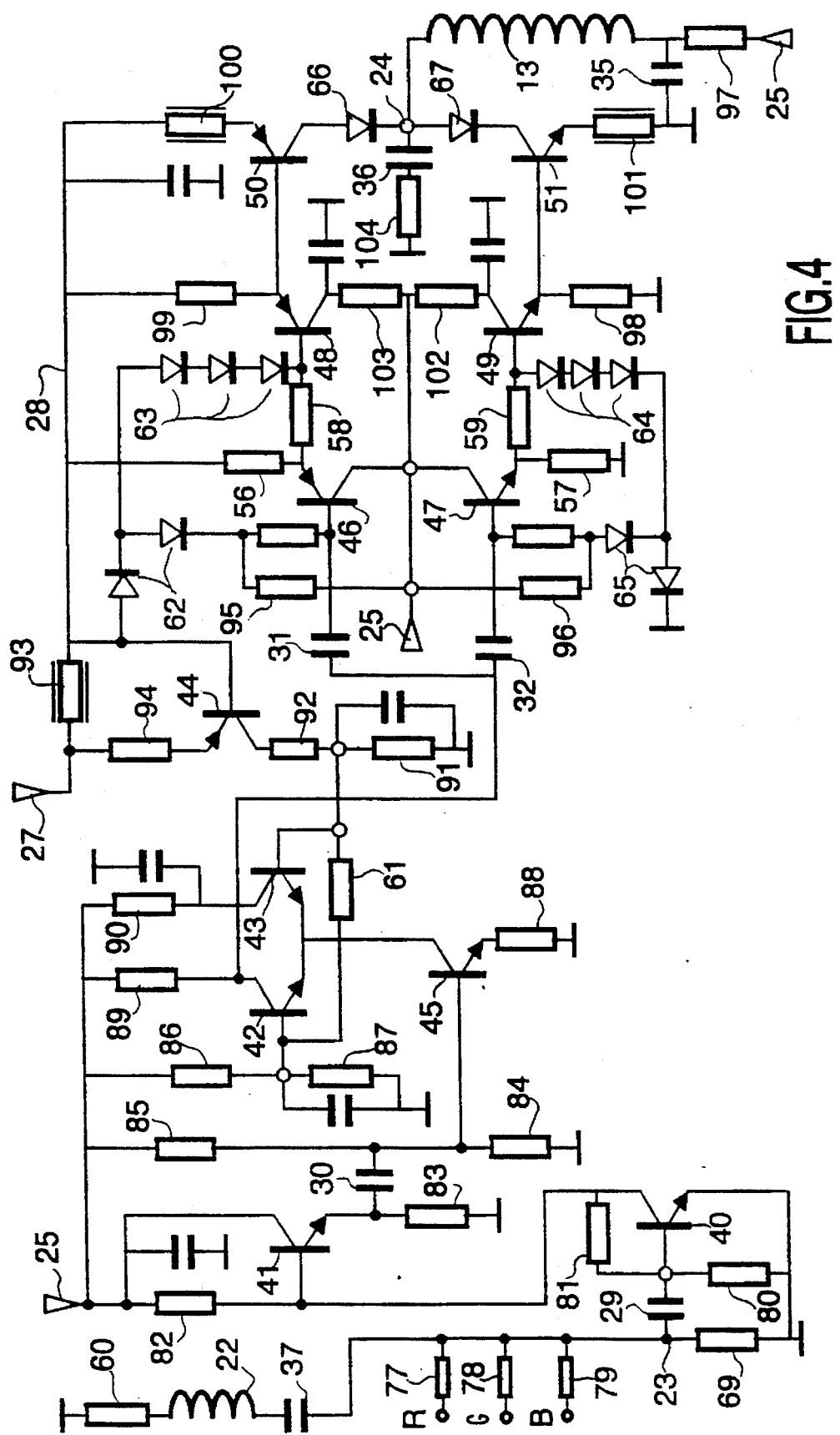
FIG. 4 is a detailed diagram of a complete embodiment of an arrangement according to the invention.

FIG. 4 shows in detail a particular embodiment of the arrangement of FIG. 2.

At the left in the Figure, the three components R, G, B (red, green, blue) are applied to a terminal of a resistor 77, 78, 79, respectively. These resistors are tied at their other terminal in a star configuration, with a common point 23 connected to ground via a resistor 69, the assembly constituting a matrix circuit which supplies the sum of the three components to the common point, i.e., it reconstitutes the luminance. A series arrangement of a capacitance 37, an inductance 22 and a resistor 60, is also connected to the point 23. This arrangement is a series resonant circuit damped by the resistor 60 which, together with the resistors 77, 78, 79, constitutes a bandstop filter which is centered on the chrominance subcarrier frequency and whose attenuation is limited by the presence of resistor 60. Estimating that the input impedance of the assembly built around the transistor 40 is between 500 and 1000 Ohms, in parallel to the resistor 69 of 1000 Ohm and to the resistors 77, 78, 79, the whole eventually constituting an impedance Z of the order of 150 Ohm, a signal present, for example, at R would be divided by about ten at the point 23 in the absence of the filter. In the presence of the filter and at the frequency of the chrominance subcarrier at which the inductance 22 and the capacitance 37 jointly represent a short circuit, the resistor 60 of 120 Ohm will be in parallel to Z and the same signal present at R is divided by about twenty: the attenuation is thus approximately two, or −6 dB. The value L is such that $L\omega$ will be about 900 Ohm, i.e., about six times Z. In practice, a value L such that $L\omega$ is between four and ten times Z is satisfactory.

The signal is transmitted via a capacitance 29 to the base of a transistor 40 of the NPN type which is arranged in a common emitter configuration and is polarized by means of a bridge comprising two resistors 80, 81 connected between the collector of the transistor and ground. The time constant provided by the capacitance 29 and the different impedances to which it is connected are chosen in such a way that the required differentiator effect is obtained. The amplified signal, which appears at the terminals of a charge resistor 82 connected to a positive power supply source 25, is applied to the base of a transistor 41 of the NPN type arranged in emitter-follower configuration, whose collector is directly connected to the source 25 and whose emitter is connected to ground via a resistor 83. The assembly comprising the capacitance 29 and the transistors 40, 41 corresponds to the differentiator stage 17 of FIG. 2.

From the emitter of the transistor 41, the amplified signal is applied via a capacitance 30 to the base of a transistor 45 of the NPN type, which is polarized by means of a bridge comprising two resistors 84, 85 connected between the power supply source 25 and ground and arranged in a common emitter configuration with a resistor 88 in its emitter connection for improving the linearity. This transistor constitutes the "tail" of a well-known differential assembly called "long tailed pair" and constituted by the transistor 45 and a pair of transistors 42, 43 of the NPN type, charged by collector resistors 89, 90, respectively. The transistor 42 is polarized by means of a bridge comprising two resistors 86, 87 connected between the power supply source 25 and ground. The base of transistor 42 is decoupled to ground by a capacitance, and is connected to the base of transistor 43 via resistor 61.

The transistor 43 is polarized by means of a particular assembly constituted by a current source transistor 44 feeding two series-arranged resistors 92, 91 whose common point is connected to the base of transistor 43. The transistor 44, of the PNP type, constitutes a current source and its emitter is connected via a resistor 94 to a positive power supply source 27. A first terminal of a low-value resistor 93, serving as a measuring resistor, in which the supply current for the power stages flows, is connected to this source 27. The base of the transistor 44 is connected to the second terminal of the resistor 93 and the direct base emitter voltage of this transistor 44 increases when the current in the power stage increases. The current in the transistors 44 and 43 thus also increases and consequently the current in the transistor 42 decreases. The output signal of the assembly is just taken from the collector of the transistor 42 and the gain of the assembly thus decreases when the current increases in the power stage. This results in an automatic control of this current and contributes to giving the curve of FIG. 2 its truncated form at the top. The second terminal of the resistor 93 constitutes a power supply source denoted by the reference numeral 28 which feeds various stages. The assembly comprising the transistors 45, 42, 43 corresponds to the gain control stage 18 of FIG. 2.

The signal at the collector of transistor 42 is applied via two capacitances 31, 32 simultaneously to the two inputs of a symmetrical preamplifier of a type which is known per se, this preamplifier having two amplification paths constituted by a cascade of two PNP transistors 46, 48 both arranged in an emitter-follower configuration, and a cascade of two NPN transistors 47, 49 both also arranged in an emitter-follower configuration. All collectors of these four transistors 46–49 are connected to the power supply source 25. The input transistor 46 of the PNP path is polarized from the power supply source 28 by means of two series-arranged diodes 62, the current of which flows into the power supply 25 via a resistor 95, while the base of the transistor 46 is connected by a resistor to the common point between the resistor 95 and the diodes 62. The emitter of the transistor 46 is connected by means of a resistor 58 to the base of the transistor 48, which realizes the polarization of this transistor. From the power supply source 28, two direct voltages of the series-arranged diodes 62 are present, which voltages are equal to the two corresponding series base-emitter voltages of the transistors 48 and 46, which provides a correct polarization of these two transistors.

The transistors 47 and 49 of the NPN path are polarized in a similar but symmetrical manner from the power supply source 25 by means of a resistor 96, the current of which flows into two series-arranged diodes 65 connected to ground, while the base of transistor 47 is connected by means of a resistor to the common point between the resistor 96 and the diodes 65, and the emitter of the transistor 47 is connected by means of a resistor 59 to the base of the transistor 49.

The base of the transistor 48 is connected by means of a cascade of three series-arranged diodes 63 to the common point of the two diodes 62, which results in a clipping of the signal at the base of the transistor 48, preventing it from falling down by more than three times the value of a direct voltage of a diode with respect to the voltage at the common point of the two diodes 62, which is indeed substantially equal to the average value of the polarization of the base of the transistor. This is what entails the effect of limitation as mentioned before. In a symmetrical manner, the base of the transistor 49 is connected, by means of a cascade of three series-arranged diodes 64, to the common point of the two diodes 65, which results in a clipping of the signal at the base of the transistor 49, preventing it from raising by more than three times the value of a direct voltage of the diode with respect to the voltage at the common point of the two diodes 65.

The emitter of the transistor 46 is connected to the power supply source 28 by means of a charge resistor 56, the emitter of the transistor 47 is connected to ground by means of a charge resistor 57, the emitter of the transistor 48 is connected to the power supply source 28 by means of a charge resistor 99, and the emitter of the transistor 49 is connected to ground by means of a charge resistor 98. Resistors 102 and 103, which are each decoupled by a capacitance connected to ground, are inserted in the connections of the respective collectors of the transistors 49 and 48 and are used for limiting the power dissipated in these transistors.

The circuit comprising the transistors 46 to 49 corresponds to the limiter preamplifier 19 of FIG. 2.

The signals at the emitters of the transistors 48 and 49 control the bases of the PNP and NPN power transistors 50 and 51, respectively, which are mutually arranged in series and are both connected as current generators with emitter resistors 100 and 101, respectively.

Two series-arranged diodes 66 and 67 are inserted between the collectors of the transistors 50 and 51, and a terminal of the supplementary coil 13 is connected to the common point 24 of these diodes. The other terminal of the supplementary coil 13 is connected to the power supply source 25 by means of a resistor 97 and to ground by means of a capacitance 35. The diodes 66, 67 have the following role: if, for example, a considerable current circulates in the coil 13 and in the transistor 51, and if the latter is suddenly blocked, the voltage at the point 24 will rise considerably and the presence of the diode 66 can prevent an inverse polarization of the transistor.

A series circuit of a resistor 104 and a capacitance 36, which is conventional in this type of amplifier (referred to as "Boucherot" circuit) and is intended to prevent auto-oscillations in certain circumstances, is also present between the common point of the diodes 66, 67 and ground.

The circuit comprising the transistors 50 and 51 constitutes the power stage denoted by the reference numeral 20 in FIG. 2.

In an embodiment yielding good results the components have the following values or are of the following types:

transistors: nos. 40, 41=BC848, nos. 42, 43=BC847, no. 44=BC858, nos. 45, 47, 49 =BC547, nos. 46, 48=BC557, no. 50=BD826, no. 51=BD825;

diodes: nos. 62 to 65=LL4148, nos. 66, 67=LL4150;

Capacitances: no. 29=47 pF, nos. 31, 32=1 nF, nos. 30, 36=27 nF, no. 37=39 pF, no. 35=47 µF;

inductances: no. 22=33 µH, deflection coil (13)=2 µH;

Resistors: nos. 93, 100, 101=10 106 , nos. 98, 99=33 Ω, no. 97=56 Ω, no. 104=100 Ω, no. 60=120 Ω, nos. 56, 57, 102, 103=330 Ω, nos. 83, 88=470 Ω, nos. 58, 59=560 Ω, nos. 69, 80, 82, 94=1 kΩ, nos. 89, 90=1.2 kΩ, nos. 77, 78, 79=1.5 k Ω, nos. 95, 96=3.3 kΩ, nos. 61, 91=6.8 kΩ, no. 81=10 kΩ, no. 87=12 kΩ, no. 84=15 kΩ, no. 86=22 kΩ, no. 92=47 kΩ, no. 85=120 kΩ. The resistors 93, 100 and 101 are safety resistors which destroy themselves without fire in case of overload.

power supply sources: no. 25=14 V, no. 27=33 V.

We claim:

1. A device for displaying color pictures based on an analog television type video signal, comprising inter alia a luminance signal and a chrominance subcarrier, said device being provided with a first bandstop filter centered on a frequency of the chrominance subcarrier, said first bandstop filter receiving the analog television type video signal and providing the luminance signal, a video signal processing circuit to which the luminance signal from the first bandstop filter is applied, and a scan velocity modulation arrangement to which the luminance signal from the first bandstop filter is also applied, said arrangement comprising a circuit for differentiating the luminance signal, followed by an amplifier which feeds a current into a coil for horizontally deflecting a spot formed on a display screen by an electron beam, characterized in that said arrangement also comprises a second bandstop filter, having an input coupled to an input of said arrangement and an output coupled to an input of said differentiating circuit, which is centered on the frequency of the chrominance subcarrier, said second bandstop filter having a limited maximum attenuation.

2. A color picture display device as claimed in claim 1, characterized in that the amplifier generates the current up to a maximum value in accordance with a non-linear law relative to the luminance signal applied to an input of the amplifier, the maximum attenuation provided by the second bandstop filter being equal, within plus or minus three decibels, to a maximum difference between said current and a further current which would be generated by a linear amplifier capable of supplying said further current up to said maximum value.

3. A color picture display device as claimed in claim 2, characterized in that the maximum attenuation provided by the second bandstop filter is between −3 dB and −9 dB.

4. A color picture display device as claimed in claim 1, characterized in that the second bandstop filter comprises a series resonant inductance and capacitance circuit, damped by a series resistor.

5. A color picture display device as claimed in claim 4, characterized in that, when the luminance signal is produced from three color components at the input of said arrangement by means of an adder consisting of a star-configured resistance network, wherein each of said color components is applied to one terminal of a respective resistor, while the other terminals of the respective resistors are joined at a central point, the series resonant inductance and capacitance circuit is connected between the central point of said star-configured resistance network and ground.

6. A color picture display device as claimed in claim 5, characterized in that, while the star-configured resistance network comprises three resistors that feeds a current in an impedance having an ohmic value Z, and the angular frequency of the chrominance subcarrier being named ω, the series resonant inductance and capacitance circuit is realized by means of an inductance having a value L such that Lω is between four and ten times z.

\* \* \* \* \*